(12) United States Patent
Frankovitz (10) Patent No.: US 9,858,341 B2
(45) Date of Patent: Jan. 2, 2018

(54) METHOD AND APPARATUS FOR REMOTELY MONITORING A SOCIAL WEBSITE

(76) Inventor: Jason Frankovitz, Los Angeles, CA (US)

( * ) Notice: Subject to any disclaimer, the term of this patent is extended or adjusted under 35 U.S.C. 154(b) by 748 days.

(21) Appl. No.: 11/833,018

(22) Filed: Aug. 2, 2007

(65) Prior Publication Data

US 2008/0126318 A1 May 29, 2008

Related U.S. Application Data

(60) Provisional application No. 60/835,257, filed on Aug. 2, 2006.

(51) Int. Cl.
*G06F 7/00* (2006.01)
*G06F 17/30* (2006.01)
*G06F 15/173* (2006.01)
*G06Q 30/00* (2012.01)
*G06Q 50/00* (2012.01)
*G06Q 99/00* (2006.01)
*G06Q 10/10* (2012.01)
*G06Q 30/02* (2012.01)
(Continued)

(52) U.S. Cl.
CPC ....... *G06F 17/30864* (2013.01); *G06Q 10/10* (2013.01); *G06Q 30/02* (2013.01); *H04L 43/00* (2013.01); *H04L 67/025* (2013.01); *H04L 67/20* (2013.01)

(58) Field of Classification Search
CPC .............. G06F 1/3209; G06F 11/3438; G06F 11/3612; G06F 17/30884; G06F 21/50; G06F 11/34

USPC ........ 707/4, 9, 10, 102, 202, 609–686, 734, 707/803, 805; 709/203, 201, 217, 223, 709/228, 246, 220, 202, 208, 204, 224; 714/4; 718/100; 711/141; 726/5; 379/88.17; 705/14.45, 14.73, 14.49, 705/14.27, 14.6, 26.1, 27.2; 706/13; 715/206

See application file for complete search history.

(56) References Cited

U.S. PATENT DOCUMENTS

5,848,412 A   12/1998   Rowland et al.
6,108,686 A    8/2000   Williams, Jr.
(Continued)

*Primary Examiner* — Jason Liao
*Assistant Examiner* — Berhanu Mitiku
(74) *Attorney, Agent, or Firm* — Hamilton, Brook, Smith & Reynolds, P.C.

(57) ABSTRACT

A computer method, apparatus, system and computer program product for remotely monitoring a social website includes monitoring user activity (events) and producing user activity data. The resulting data may be processed separately from the social website. The processed user activity data may be stored and information indicative of the data may be reported. Monitoring user activity may be in response to a call from a social website. Thus, a plurality of websites may be monitored and data from these websites may be normalized. Remotely monitoring a plurality of social websites allows the invention system to identify activity/data trends, such as individual or group user trends, or larger societal trends identifiable across the plurality of websites. The invention may monitor user activity in a substantially real-time manner or alternatively may store indicative user activity data for later processing. User activity data may also be encrypted/decrypted and/or authenticated to ensure data integrity.

24 Claims, 8 Drawing Sheets

(51) Int. Cl.
*H04L 12/26* (2006.01)
*H04L 29/08* (2006.01)

(56) References Cited

U.S. PATENT DOCUMENTS

| | | | |
|---|---|---|---|
| 6,141,694 A | 10/2000 | Gardner | |
| 6,178,443 B1 | 1/2001 | Lin | |
| 6,182,084 B1 | 1/2001 | Cockrell et al. | |
| 6,256,620 B1 | 7/2001 | Jawahar et al. | |
| 7,181,438 B1* | 2/2007 | Szabo | 707/2 |
| 7,349,890 B1 | 3/2008 | Pathak et al. | |
| 7,631,007 B2* | 12/2009 | Morris | |
| 7,716,332 B1 | 5/2010 | Topfl et al. | |
| 7,774,235 B2 | 8/2010 | Browne et al. | |
| 7,801,905 B1* | 9/2010 | Singh et al. | 707/758 |
| 7,958,459 B1 | 6/2011 | Mahmood et al. | |
| 8,031,847 B2 | 10/2011 | Fitch | |
| 8,112,550 B2 | 2/2012 | Wilson | |
| 8,261,299 B2 | 9/2012 | Pirani et al. | |
| 2001/0012299 A1 | 8/2001 | Dahlen | |
| 2002/0029225 A1 | 3/2002 | Matsuzaki et al. | |
| 2002/0038365 A1 | 3/2002 | Yeh | |
| 2002/0069100 A1 | 6/2002 | Arberman | |
| 2002/0087679 A1* | 7/2002 | Pulley et al. | 709/224 |
| 2002/0095491 A1 | 7/2002 | Edmonds et al. | |
| 2002/0128925 A1* | 9/2002 | Angeles | 705/26 |
| 2002/0147570 A1 | 10/2002 | Kraft et al. | |
| 2002/0161766 A1 | 10/2002 | Lawson et al. | |
| 2002/0188542 A1 | 12/2002 | Zhang et al. | |
| 2003/0041044 A1 | 2/2003 | Monestere, III | |
| 2003/0167273 A1 | 9/2003 | Alexander et al. | |
| 2004/0024767 A1 | 2/2004 | Chen | |
| 2004/0027376 A1 | 2/2004 | Calder et al. | |
| 2004/0102928 A1 | 5/2004 | Cuddihy et al. | |
| 2004/0164961 A1 | 8/2004 | Bal et al. | |
| 2005/0165808 A1 | 7/2005 | Ohtani et al. | |
| 2005/0216332 A1 | 9/2005 | Lewin | |
| 2005/0267973 A1* | 12/2005 | Carlson | G06Q 30/06 709/228 |
| 2006/0112079 A1 | 5/2006 | Holt et al. | |
| 2006/0136504 A1 | 6/2006 | Babutzka | |
| 2006/0248061 A1* | 11/2006 | Kulakow et al. | 707/3 |
| 2007/0061869 A1* | 3/2007 | DeHaas | G06F 21/6209 726/2 |
| 2007/0067306 A1 | 3/2007 | Dinger | |
| 2007/0067331 A1* | 3/2007 | Schachter | G06Q 30/02 |
| 2007/0067444 A1* | 3/2007 | McCarty et al. | 709/224 |
| 2007/0111767 A1* | 5/2007 | Brown et al. | 463/1 |
| 2007/0174304 A1 | 7/2007 | Shrufi et al. | |
| 2007/0239452 A1 | 10/2007 | Madhavan et al. | |
| 2007/0300174 A1* | 12/2007 | Macbeth et al. | 715/772 |
| 2008/0222098 A1 | 9/2008 | Simpson | |
| 2010/0306048 A1 | 12/2010 | Corduneanu et al. | |
| 2011/0015969 A1 | 1/2011 | Loeb | |
| 2011/0213822 A1* | 9/2011 | Yavilevich | 709/202 |
| 2011/0276397 A1 | 11/2011 | Moxley et al. | |
| 2012/0047161 A1 | 2/2012 | Moadus et al. | |

* cited by examiner

METHOD AND APPARATUS FOR REMOTELY MONITORING A SOCIAL WEBSITE

RELATED APPLICATION

This application claims the benefit of U.S. Provisional Application No. 60/835,257, filed on Aug. 2, 2006. The entire teachings of the above application(s) are incorporated herein by reference.

BACKGROUND OF THE INVENTION

The amount of time that consumers spend on the Internet has steadily increased, as has the variety of web content, such that the Internet is often the first place many people turn to when searching for information, news, or entertainment. Consumers use a variety of methods to search for desired information on the Internet such as entering terms in a search engine. When a site of interest is found, users often times will bookmark the site to facilitate return visits. Over time, a user may develop a list of relevant sites based on a number of different topics. However, the constantly increasing number of websites has increased the time and effort it takes to weed through relevant websites.

Social networks provide another method for consumers to more quickly locate websites of interest. One example of social websites are social bookmark sites where users share their bookmarks with other users. The user will save bookmarks or tags associated with a web page of interest at the bookmark website. Users may also "tag" a website by associating a term or label with the website allowing the categorization of different sites based on the tag.

Thus, rather than using a search engine where software alone searches for a website based on content, social bookmark sites effectively use human beings (i.e., the users themselves) to rate and sort websites. Consequently, because a user found a webpage relevant enough to bookmark or tag, websites based on a particular topic are likely to be more relevant than software generated searches. Users may search other users' bookmarks based on the topic they are interested in to quickly locate relevant web sites.

In addition, the very nature of a user's bookmarking and tagging behavior inherently identifies a user's interest in particular topics—much more than current methods which rely on page content, often, a simple "keyword presence" or in some cases, a more sophisticated linguistic processing of the page the user is viewing. Furthermore, while the user may arrive at a page of interest, most techniques do little to "know" the actual intentions of the user. While there are some techniques that try to deduce actual intention by performing tracking on a user's past behavior, they do so on the basis of identifying which pages have already been browsed by the user, thereby assuming that viewing a page indicates significant personal interest in the topics on that page where no such significant interest may actually exist.

SUMMARY OF THE INVENTION

The present invention addresses the foregoing problems in the prior art. In particular, the invention provides a method and apparatus for remotely monitoring a social website for the purpose of centrally aggregating activity.

In a preferred embodiment, the inventive computer implemented method and system for remotely monitoring a social website comprises (a) monitoring user activity on a remote social website that results in user activity data, (b) processing the user activity data separately from the social website that is being monitored, and (c) storing the processed user activity data. Information indicative of the processed user activity data may be reported.

In accordance with an example embodiment of the invention, monitoring user activity may be a response to a call from the social website triggered by user activity at the social website, for example, an application programming interface (API) call. Alternatively, the system may monitor user activity by polling a monitoring service installed on the remote social website on a periodic, aperiodic, or event driven basis. Monitoring may effectively log or record user activity, and may be further represented in the form of a uniform resource locator (URL).

In accordance with another example embodiment, the invention may parse user activity data from a plurality of social websites and then "normalize" or "standardize" the parsed user activity data. The processed results may be stored in, for example, a searchable data store such as a database. The results from the plurality of websites may also be centralized in a common database. Processing user activity data may include performing on-the-fly analysis of the data or the data may be stored and analyzed at a later time.

In another embodiment, a classification system (CS) may be queried prior to displaying a requested web page at the social website. The classification system determines user target information as a part of the invention processing user activity data. A report may be communicated to a remote third-party or back to the social website, and may communicate the stored processed user activity data.

In accordance with yet another example embodiment, user activity may be monitored by locally tracking and accumulating user activity at the social website. The accumulated activity may be communicated to a classification service (CS), and may be performed in a substantially real-time manner, or in a periodic, aperiodic, or event driven basis. The classification system determines user target information as a part of the invention processing user activity data. The reported user activity data may be in the form of metadata, and may take the form of, for example, user ID, timestamp information, IP address, etc.

According to one example embodiment of the invention the report may include communicating data representative of other user activity to a third party, such as an advertisement server. According to another embodiment, communicated information may be encrypted prior to communicating or transmitting the data, and may similarly be decrypted at a receiving location. In addition, or alternatively, data may also be authenticated in order to, for example, circumvent requests from unauthorized third parties.

In another embodiment, user activity data may be processed in a substantially real-time manner. The invention may remotely monitor a plurality of social websites, where, for example, tagging all bookmarking website content by the user is allowed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the invention.

DETAILED DESCRIPTION OF THE INVENTION

A description of example embodiments of the invention follows.

The popularity of social networks and social bookmarking websites has grown dramatically such that they now number in the hundreds. The higher the number and variety of users a social bookmark site attracts, the more likely relevant websites will be found. However, recent analysis of a number of social websites has revealed that large number of bookmarks and tags are from a disproportionately small number of highly active users, thus, potentially skewing a particular website's effectiveness across the general public. To make better use of social networks, it would be useful to remotely monitor and centrally aggregate social websites to provide a larger number and variety of user bookmarks and tags from which to derive and analyze user activity thereby improving trend identification and targeting advertisements.

A user's bookmark and tag information may be valuable as market research data. For example, a user who has bookmarked or tagged digital photography sites would be of interest to photographic equipment suppliers. Furthermore, as discussed above, aggregating user activity data across the large number of social websites would facilitate the identification of user and societal trends. For example, if webpages associated with the term "water parks" are bookmarked/tagged at a high frequency, ads displayed to users with those bookmarks could command an additional cost premium.

Temporal Trending

Interactions with a social site (social bookmarking, forums, and any site that allows multiple users to comment on (by tagging, etc.) other sites or entries (e.g. blog entries)) can be analyzed to ascertain the amount of interest a particular user has in specific subjects.

If, for example, a user has been commenting (bookmarking/tagging, etc.) on Digital camera review sites, or shopping sites for digital cameras, you can infer that that user has a purchase interest in digital cameras.

This can be specifically quantified by choosing broad areas of interests (specific tags, or clusters of semantically related tags.) The frequency within a given time period (say the last week) of such events (like bookmarking and tagging a site related to, for example, digital photography) indicates high interest and therefore, likely, a high yield on advertising related to digital photography.

Also, aggregating data across many users can also be used to demonstrate value for specific tag/keyword purchases. If, for example, waterpark-related activity is "hot" among a social sites users, such keywords could demand a higher price.

Finally, aggregating data across multiple SB (social bookmarking) sites can provide insights about larger trends moving through an online population as a whole. Such information can be used to derive statistically-significant metrics or observation data of market trends, brand penetration, competitive analysis, audience measurement, and many other commercial and/or academic applications.

The current invention provides a technique for remotely monitoring one or more social websites 410 (FIG. 4) where the resulting user activity data is processed and stored remotely, i.e., separately from the social website 410. To monitor user activity data or "events" on a remote social website 410, the technique may install a small amount of software code into the social website's operating code. The code generates a specially-formed "Observer" uniform resource locator (URL) that is sent to a remote monitor 415 when an event occurs. The parameters in the Observer URL describe the event that a user 405 performs on the social website 410. The monitoring process tracks multiple kinds of bookmark and tag events, so the code may be installed in the subject social website's code where those events actually happen and may be invoked using, for example, UNIX's "curl", "lynx", or "wget" programs, or any compatible application that can reliably generate a standards-compliant HTTP GET query.

The format of the Observer URL may be as follows:

http://obl.seethroo.us:8000/event/
lg?user=a&bookmark=b&title=c&tag=d&eve
nt=e&ipnum=f&timestamp=g&sting=h&site=i&adtag=j Each parameter of the Observer URL holds a different piece of information about the event being monitored. The letters 'a' through 'j' in the example Observer URL above will be replaced with actual values when installing it on the social website's server, such as the following:

In user=a, the "a" may be replaced with the escaped (Web-safe) user ID of the person performing the event. For example, if the user is "jsmith", the parameter would be "user=jsmith". The monitoring process does not require an actual user name—any unique identifier that is consistently associated with the same user on the social website is permitted. For example, if the user is "jsmith" and a unique ID for jsmith is 05b7f505fb63e9737dd1fce86d8ca2a97d21654f, the parameter would be "user=05b7f505fb63e9737dd1fce86d8ca2a97d21654f".

In bookmark=b, the "b" may be replaced with the escaped (Web-safe) URL of the bookmark involved in the event, if any. If the event is exclusively tag-related (see below) and there is no bookmark involved, the parameter is left blank in one embodiment. For example: if the bookmark is "http://www.cnn.com/health", the parameter would be "bookmark=http%3A//www.cnn.com/health"

In title=c, the "c" may be replaced with the escaped (Web-safe) title of the bookmark involved in the event. If the event is exclusively tag-related (see below) and there is no bookmark title involved, the parameter is left blank in one embodiment. For example, if the title is "CNN.com—Health", the parameter would be "title=CNN.com%20-%20Health".

In tag=d, the "d" may be replaced with the escaped (Web-safe) tag (or comma-separated list of tags) involved in the event. If the event is exclusively bookmark-related (see below) and there is no tag involved, the parameter is left blank in one embodiment. If there is only one tag, the trailing comma may be omitted. For example, if there are three tags named "news, health, exercise", the parameter would be "tag=news%2Chealth%2Cexercise". If there is one tag named "microsoft", the parameter would be "tag=microsoft".

In event=e, the "e" may be replaced with the escaped (Web-safe) text describing what the event is and may include a variety of event-specific tokens, such as these examples:

add_bkmk (used when a new bookmark is added to the user's account)

click_bkmk (used when the user clicks on one of their bookmarks)

del_bkmk (used when the user erases a bookmark)

add_tag (used when the user first adds a tag onto a bookmarks), or to their account in general)

view_tag (used when the user views bookmarks assigned with the same tag)

del_tag (used when the user erases a tag from a bookmark or their account)

search (used when a search is performed, either of the user's own bookmarks/tags or across the entire social website)

import (used when the user uploads or imports their bookmarks)

For example, if the user is adding a bookmark to his account, the parameter would be "event=add_bkmk." Users may also import large files containing several bookmarks.

In ipnum=f, the "f" may be replaced with the escaped (Web-safe) IP number of the remote host using the social website. For example, if the user's remote computer has an IP number of "207.69.101.5", the parameter would be "ipnum=207.69.101.5".

In timestamp=g, the "g" may be replaced with the escaped (Web-safe) timestamp of when the event occurred, using any suitable format, such as the ISO8601 format. The timestamp "Sat Sep 02 2006 00:21:13 GMT-0400 (EDT)" would be "2006-09-02T00:21:13-04:00" in ISO8601 format, for example. Thus, if the event has a timestamp of "Sat Sep 02 2006 00:21:13 GMT-0400 (EDT)" the parameter would be "timestamp=2006-09-02T00%3A21%3A13-04%3A00.

In string-h, the "h" may be replaced with the escaped (Web-safe) text the user performed a search on. For example, if the event is "search" and the user performed a search for "electronic arts bond", the parameter would be "string=electronic%20arts%20bond". If the event parameter does not indicate a search, then this parameter may be left blank.

In site=i, the "i" may be replaced with the escaped (Web-safe) id of the social website. For example, if the website is "Connectedy.com", the parameter would be "site=connectedy." As in the user parameter (above), the monitoring process does not require the actual name of the social website—any unique identifier that is consistently associated with the same social website is permitted.

In adtag=j, the "j" may be replaced with any value, including "y" or "n", indicating that a targeted ad should be sent back to the social website after the Observer URL has been processed by the monitoring server.

Figure 4:
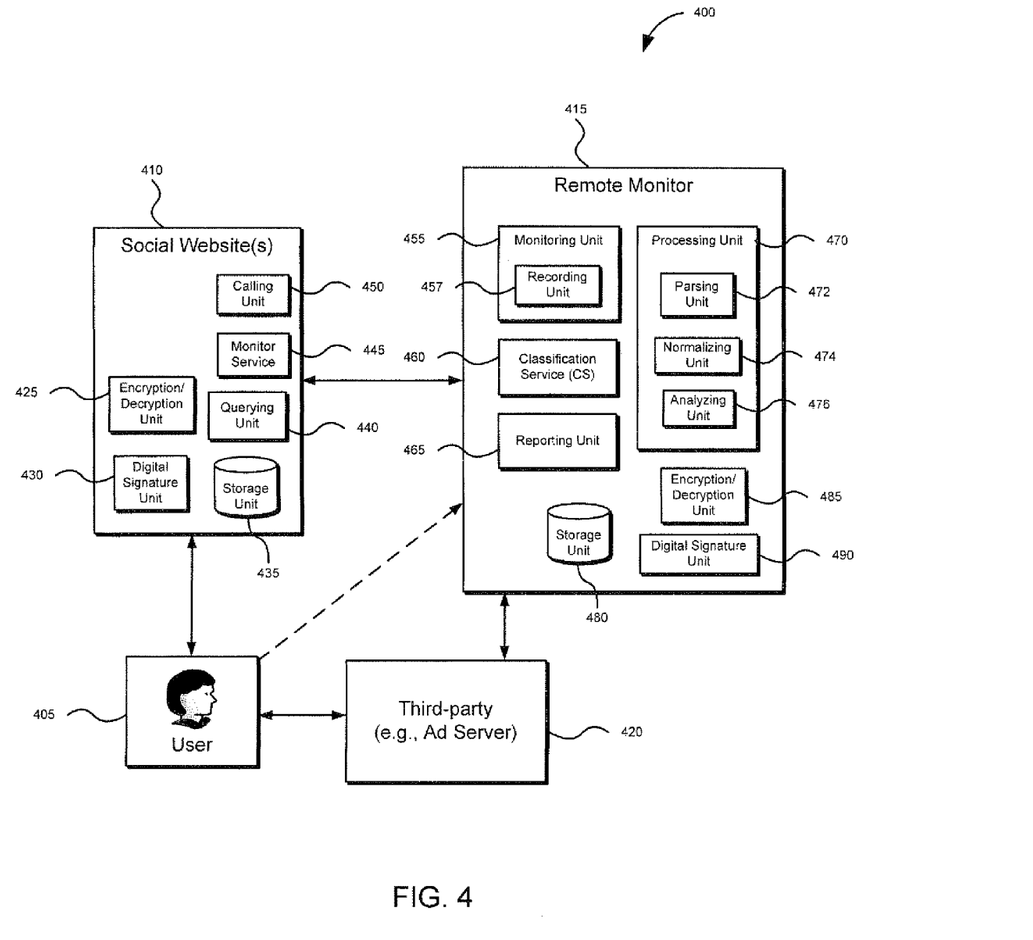
FIG. 4 is a block diagram illustrating different components of a remote monitor system embodying the present invention.

Thus, using the above examples, the complete TJRL could look like the following:

http://obl.seethroo.us:8000/event/lg?user=05b7f505fb63e9737dd1fce86d8ca2a97d21654f&bookmark=http%3A//www.cnn.com/health&title=CNN.com%20-%20Health&tag=news%2Chealth%2Cexercise&event=add_bkmk&ipnum=207.6 9.101.5&timestamp=2006-09-02T0003A21%3A13-04%3A00&string=&site-connectedy&adtag=y In this manner, the event of "adding a new bookmark" on the social website may be monitored by performing the following sequence of actions:

1. A developer locates the specific commands in the social website's 410 program code that are invoked when a user 405 adds a new bookmark to his account.

2. Immediately preceding or following these commands, the developer edits the program to insert an additional command. This additional command, when executed, sends the Observer URL to the remote monitor 415. The exact command used to send the Observer URL is dependent on the programming language and web serving environment used by the social website 410.

3. The developer associates each parameter in the Observer URL with whatever specific variables are used by the social website 410 to describe the event. For example, the parameter in the Observer URL that holds the name of the bookmark is called "title". If the subject social website's code normally uses "$bookmark_name" to represent this, the developer would edit the Observer URL to say "title=$bookmark_name". Note that the specifics of this will also vary, depending on the programming language and web serving environment used by the social website 410.

4. The developer repeats this process, adding the Observer URL to each place in the program code that performs each of the events that the remote monitor tracks, and adding the correct names of variables used by the social website 410 that match the Observer URL's parameters.

5. Once the command that sends the Observer URL to the remote monitor 415 has been installed into the correct places in the social website's code, the remote monitor 415 can begin receiving events in real-time from the social website 410.

6. When a user 405 of the social website 410 adds a bookmark to his account, the social website 410 performs the task as normal. At virtually the same moment (either immediately preceding or following), the Observer URL is sent via a global computer network 70 (e.g., the Internet) to the remote monitor 415. The parameters in the Observer URL contain all the details describing the event, such as the name of the bookmark, the encrypted ID of the person who is adding the bookmark, the bookmark's URL, any tags used with the bookmark, the time the bookmark is being added, the IP number of the person's computer, and whatever other metadata have been included in the Observer URL.

7. The remote monitor 415 continually waits for Observer URLs to be sent. When the remote monitor 415 receives a request containing the Observer URL, it accepts the URL as input and the monitoring program 455, 470 runs.

8. The monitoring program 455, 470 accepts the request and parses the text of the URL to assign each parameter into a dedicated field in a local database 480. The UKL's parameters are separated, decoded/unescaped and used to construct a new data record in memory 480.

9. Once the data record is assembled and stored in memory, the record is written into the storage unit (e.g., database) 480. At this point the original event at the social website 410 has been effectively duplicated and recorded by the remote monitor 415.

10. Once the record has been saved in, for example, a storage unit (e.g., database) 480, the remote monitor 415 may or may not reply. If the "adtag" parameter in the Observer URL has a value of 'n', the monitoring server 415 may close the network connection without any reply to the social website 410. This is to ensure that the social website 410 will continue performing its normal tasks as quickly as possible, without waiting for a monitoring response that may not arrive, perhaps due to a network error, programming bug, or some other problem. Alternately, if the "adtag" parameter in the Observer URL has a value of 'y', then the remote monitor 415 will use the information from the Observer URL to choose an advertisement that is a suitable match.

11. The selection of the ad can be done either locally, by accessing a store of ads to be sent to the social website 410 in reply to the monitored event, or remotely, by sending a descriptive token or keyword to a third-party ad server 420, which then selects an ad and returns it to be displayed on the social website 410.

Figure 1:
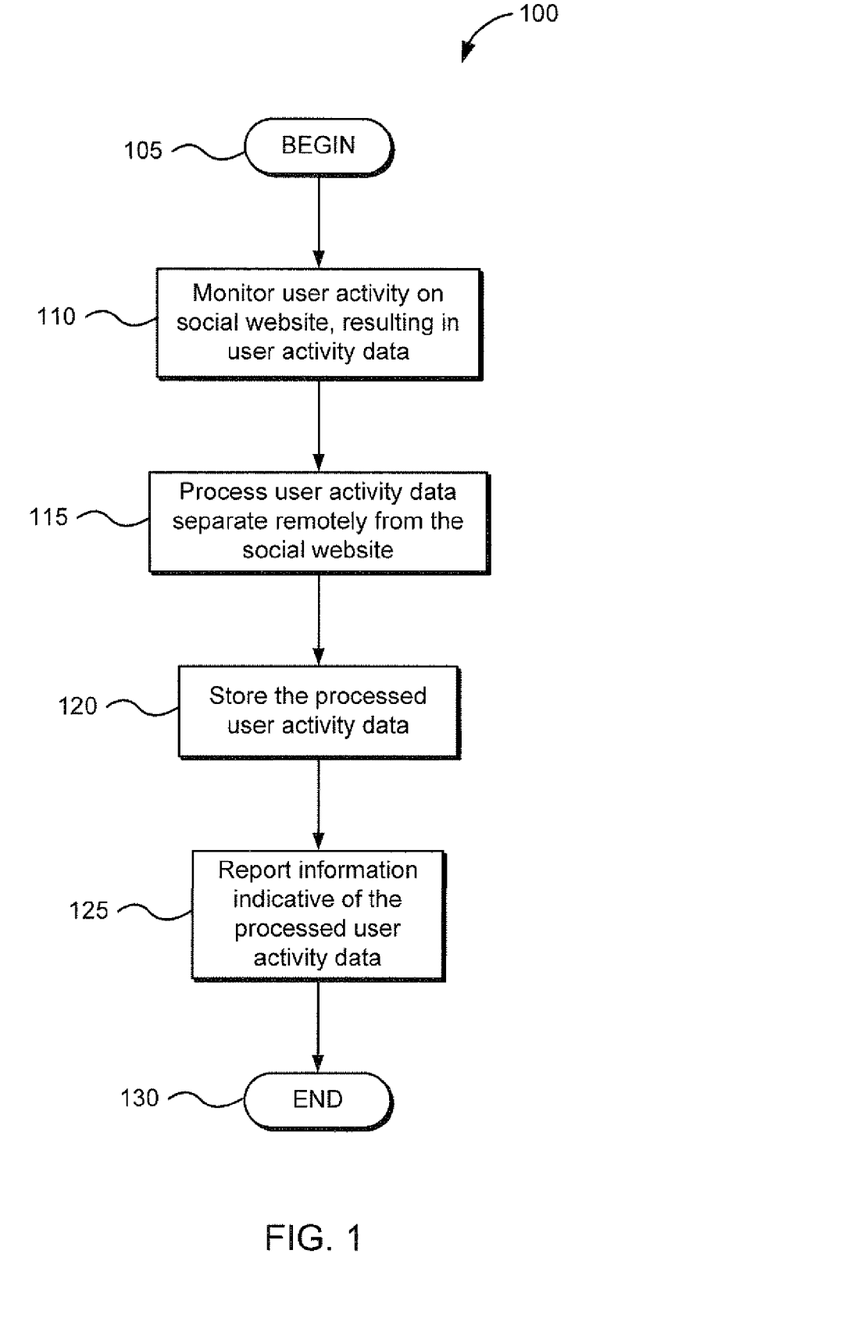
FIG. 1 is a flow diagram of an example embodiment of the present invention.

Referring now to FIG. 1, a flow diagram illustrating an example embodiment of the invention is depicted. The process 100 begins 105 and monitors user activity on a social website at step 110. The monitoring step/process results in user activity data such as that described above. The resulting user activity data is processed separately or remotely from the social website that step 115. After processing step 115, the invention process 100 may store (step 120) processed user activity data in, for example, a searchable data store. Information indicative of the processed user activity data may be reported at step 125. The process 100 may then end 130.

Figure 2:
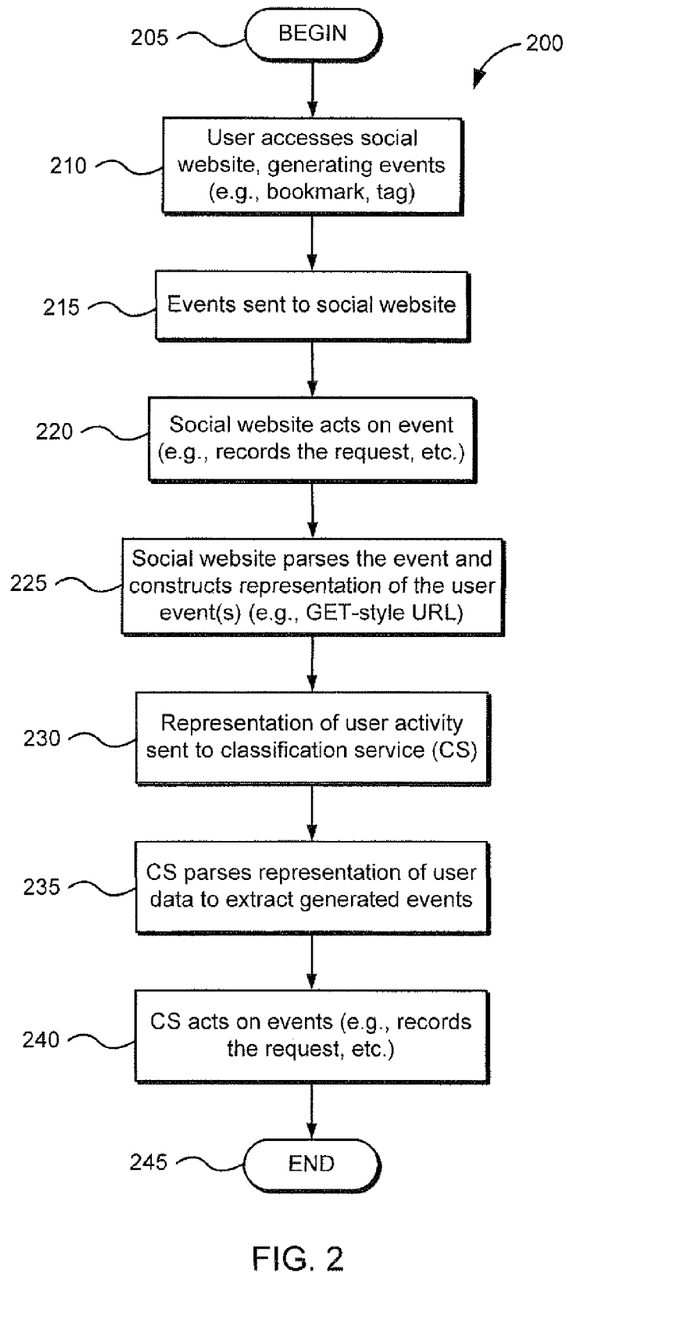
FIG. 2 is a flow diagram of an alternative example embodiment of the present invention.

FIG. 2 is a flow diagram illustrating an alternative example embodiment of the invention. The invention process 200 begins 205 with a user accessing a social website 210 whereby a variety of events are generated (step 210). For example, users 405 of a social bookmarking site 410 may access their bookmarks thereby generating events involving bookmark links and tags, such as "add bookmark," "click bookmark," and "add tag." These events may be sent to a social website (step 215) via a computer or other communication network, such as the Internet, as requests to the social bookmarking server.

The social website 410 may act on the events (step 220). For example, a social bookmarking site 410 may receive the bookmarking and/or tag events and the server may perform actions to process the request. The social bookmarking site 410 records the request (or otherwise acts on it, executing whatever code is programmed). The social bookmarking site 410 may also parse the details of the request and construct a representation of user activity (step 225), such as a GET-style URL (such as that discussed above) to describe the event that was just recorded. Next, the social website 410 sends the representation of user activity (e.g., the GET URL) to a classification service (CS) 460 (in FIG. 4) at step 230 in FIG. 2.

The classification service 460 receives the representation of user data and parses it to extract generated events (step 235), such as parameters describing the event that was just recorded, or the URL can remain unparsed and recorded unchanged, for later processing. The classification service 460 then acts on the events (step 240), such as recording the request (or executing whatever code is programmed). The process 200 then ends 245.

Processing of interactions: 1. The CS database is built up by recording each action that occurs on the SB (social bookmarking) site, using either: A. A simple logging mechanism. E.g. the activity is recorded in a file or database log of activities, or B. Through an API call to the CS, which then records the activity and potentially performs on-the-fly analysis aggregating the data for later processing and delivery. 2. Meaningful groupings and statistics are generated from the collection of interactions taking into account the timing of those interactions as well as statistically-significant groupings and relationships between related interactions. Related interactions can be semantically related through tags, temporally related by the proximity in time in which they occur, or through relationships specified through the structure of the social site, such as "friends", and/or "groups" of users (whether by a manual subscription process or automatic site-generated associations between users).

Figure 3:
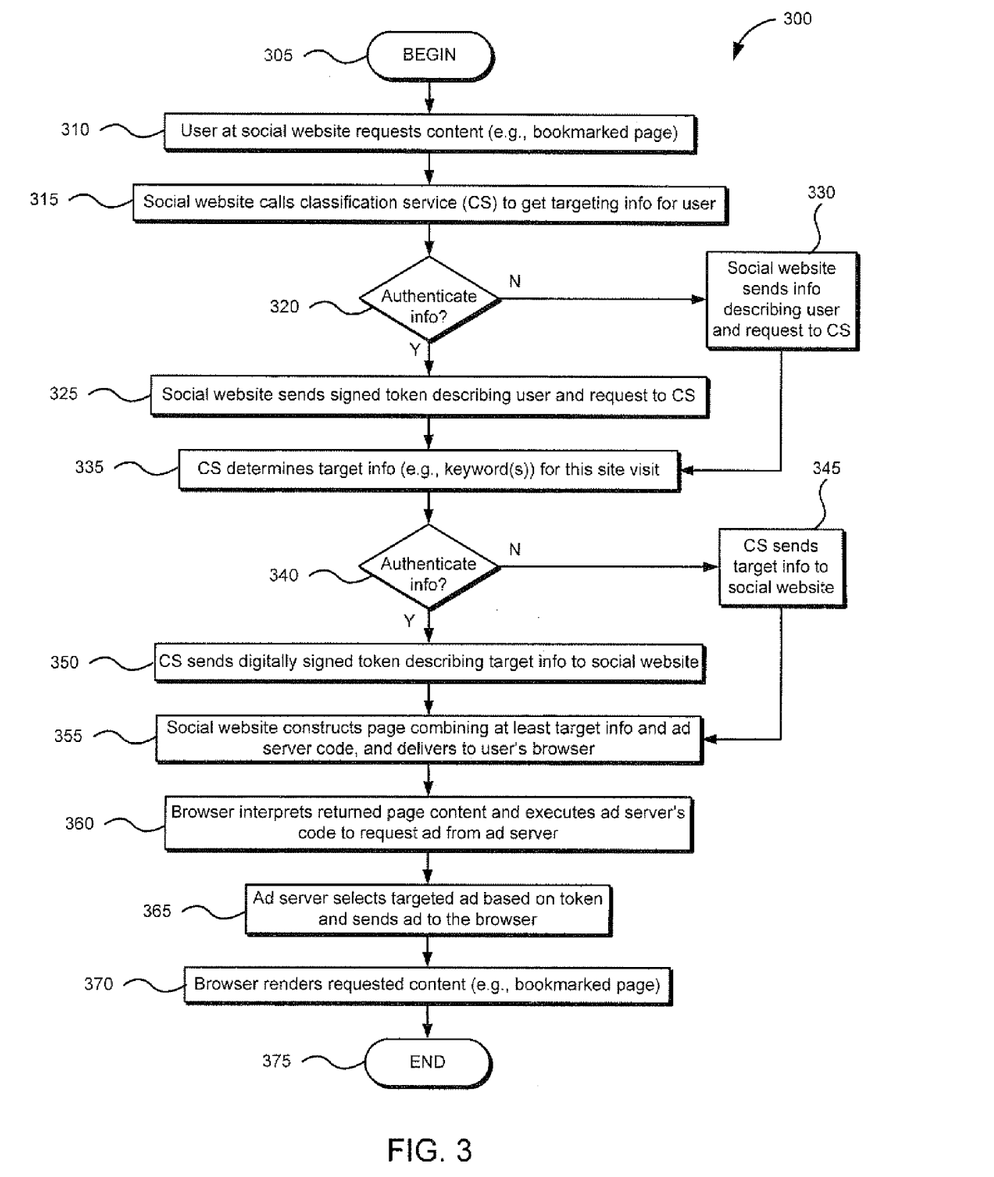
FIG. 3 is a flow diagram of another alternative embodiment of the present invention.

FIG. 3 is a more detailed flow diagram illustrating an example embodiment of the present invention. The process 300 begins 305 with a user 405 at a social website 410 requesting content (step 310) via a web browser, for example, a page containing the user's bookmarks. The social website 410 then calls a classification service 460 to get targeting information for the user (step 315). To ensure integrity of the received data, the social website 410 may authenticate the information at step 320. The process 300 continues and at step 325 the social website 410 sends either a signed token describing the user 405 and request to the classification service 460, or at step 330 sends an unauthenticated version of the information describing the user 405 and request to the classification service 460.

The classification service 460 determines target information at step 335' such as appropriate keywords and may also record the event. The classification system 460 then sends target information to the social website at step 345, or may optionally authenticate the information at step 340 and send a digitally signed token describing the target information to the social website at step 350. The social website 410 then constructs a webpage combining its own content, the target information and advertisement server code and delivers it to the user at step 355. The user's browser interprets the returned page's content and executes the advertisement server's code to request an ad from the advertisement server 420. Next, the advertisement server 420 selects a targeted ad based on the targeted information or token and then sends the ad back to the user's browser at step 365. After receiving the targeted ad, the users browser renders the content, for example, the combined requested bookmark page and the targeted ad at step 370. The process 300 then ends 375.

FIG. 4 is a block diagram of a remote monitoring system 400 according to an example embodiment of the invention. The remote monitoring system 400 may contain a remote monitor 415 which includes a monitoring unit 455, classification service (CS) 460, reporting unit 465, processing unit 470, storage unit 480, encryption/decryption unit 485, and digital signature unit 490. The system 400 may remotely monitor user 405 activity on at least one remote social website 410. The social website 410 may include an encryption/decryption unit 425, digital signature unit 430, storage unit 435, querying unit 440, monitor service 445, and calling unit 450. A monitoring service unit 445 may be configured to monitor user activity 405 on a remote social website 410, resulting in user activity data. The processing unit 470 is configured to process the results user activity data separately from the social website 410, in a substantially real-time manner, or processed at a later time. The user activity data may be stored in the storage unit 480. The reporting unit 465 may be configured to report information indicative of the processed user activity data.

The monitoring unit 455 may be configured to monitor user 405 activity in response to a call from the social website's 410 calling unit 450 that may be triggered by the user's activity at the social website. The call may be an application programming interface (API) call, or similar call known in the art. Alternatively the monitoring unit 455 may be configured to poll the monitor service 445 that is installed on the remote social website 410 on a periodic, aperiodic, or event-driven basis. In either case, the monitoring unit 455 effectively logs or records the user's activity. In one embodiment the user activity data may be represented in the form of a uniform resource locator (URL). And in another example embodiment, a monitoring unit 455 may be configured to locally track and accumulate user activity at the remote social website 410, and may communicate the user activity data to the CS 460 where the CS determines user target information on a periodic, aperiodic, or event-driven basis.

The processing unit 470, through use of a parsing unit 472 may parse the user activity data results from the remotely monitored social websites(s) 410. The normalizing unit 474 may "normalize" or "standardize" the parsed user activity data. That is, social websites 410 may store particular data fields using slightly different identifiers. For example, one social website 410 may store the user's identity in a field labeled "user" and another social website 410 may store the same information in a field "userID" and still another social website may use the label "username." Thus, the invention normalizing unit 474 effectively standardizes non-standardized field names from a variety of social websites 410 using a common label or identifier allowing the aggregation of user activity data from virtually every social website. Advantageously, the invention aggregates data from a plurality of social websites 410 allowing the identification of trends not currently identifiable, such as trends across a large number of users or more broadly such as societal trends. To facilitate this analysis, the storage unit 480 may be configured to store the processed results in a centralized, searchable data store such as a database where the normalizing unit 474 has standardized the results data. Alternatively this information may be distributed across multiple storage units 480 to provide data redundancy, increased search speeds, and other benefits known in the art.

The processing unit 470 may also be configured to perform on-the-fly analysis of the user activity data, or alternatively, may store the user activity data for analysis at a later time. The querying unit 440 of the social website 410 may also be configured to query the CS 460 before the social website displays the user requested page where the CS 460 determines user target information. In an example embodiment, the reporting unit 465 may be further configured to communicate and transmit the stored process user activity data to a third party, such as an advertisement server 420. The reporting unit 465 may also be configured to report user activity data represented in the form of metadata or other data or file formats known in the art. Alternatively, or in addition, the reporting unit 465 may also be configured to generate a targeted advertisement based on user activity data and may communicate that advertisement to a third-party 420 or to the social website 410 for display in the user's 405 browser.

The user activity data may be protected using a variety of data protection techniques known to those skilled in the art. For example, the encryption/decryption unit 485 of remote monitor 415 may encrypt data prior to transmitting the data to the social website 410 where in turn the encryption/decryption unit 425 of the social website 410 will then decrypt the information. It should be understood that in order to provide effective data protection the encryption/decryption process may occur throughout the entire chain of data transmission, including but not limited to, from the social website 410 to the remote monitor 415, from the remote monitor 415 to the third-party server 420, from the third-party server 420 to the remote monitor 415, and from the remote monitor 415 to the social website 410. Alternatively, or in addition, the digital signature unit 490 may be used to authenticate data according to data authentication techniques known in the art. This may be useful in circumventing fraudulent requests (e.g., metadata, spam, etc.) from unauthorized third parties, for example, preventing a third-party from writing bogus data to the remote monitoring unit 415.

The social website 410 may be a website where users are allowed to associate a tag or bookmark to the social website's content. Social websites have proliferated at an increasingly rapid rate such that there are now hundreds of social websites currently in operation. The invention 400 may also be used in conjunction with other social web sites 410, such as blogs or any other website that allows the use of tags to be added and/or associated with content.

Figure 5:
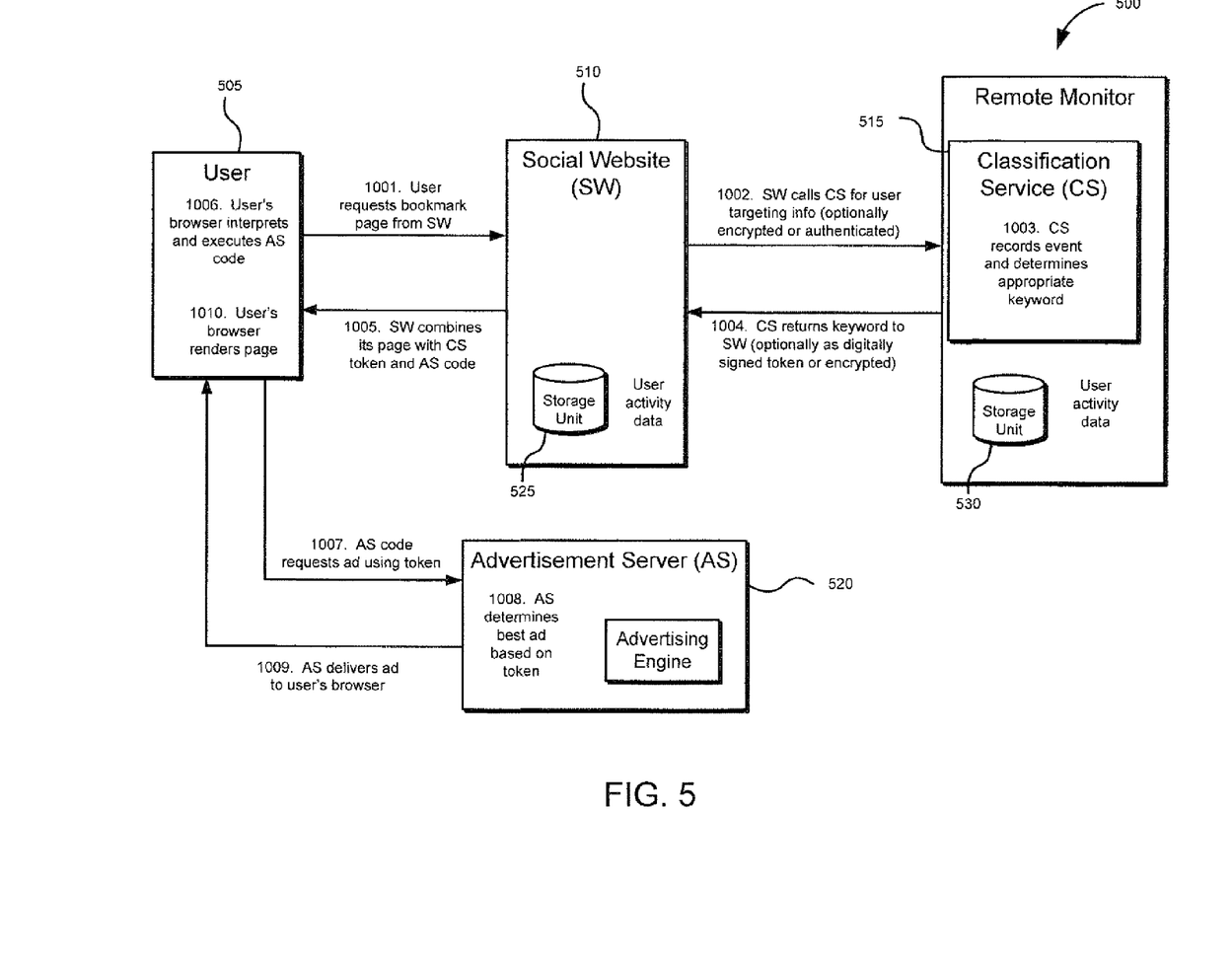
FIG. 5 is a schematic illustration depicting dataflow according to one embodiment of the present invention.

FIG. 5 is a schematic diagram representing data flow in an example embodiment 500 of the invention. The remote monitoring system 500 may comprise a classification system (CS) 515 implemented using, for example, a processor (not shown). A user 505 may request a bookmark page from a social website 510 (step 1). The social website 510 then calls the CS 515 in order to obtain user targeting information (step 2). As mentioned above this communication may be encrypted, and digitally signed or otherwise made secure. The CS 515 may record the event in a storage unit 530, such as a searchable database. The CS 515 may also analyze previous and/or current activity data for the user 505 as previously recorded in storage unit 530 in order to determine an appropriate keyword or multiple keywords (step 3). In this embodiment, the CS 515 is guaranteed to record the event before the CS performs its ad selecting analysis.

The CS 515 then returns the determined keyword(s) either as it is, or encrypted, or as a digitally signed token back to the social website 510 (step 4). The social website 510 then combines its page with the CS keyword/token and advertisement server code (step 5). Alternatively, the CS can return both the keyword(s) and the advertisement server code together. Next, in response the user's browser interprets the received combined page and executes the advertisement server code (step 6). The advertisement server code may then request an ad using the received keyword/token (step 7). The advertisement server 520 may determine the best ad based on the subject keyword/token (step 8). The advertisement server 520 then delivers the determined ad to the user's browser (step 9) where the user's browser then renders the user's requested page (step 10).

Figure 6:
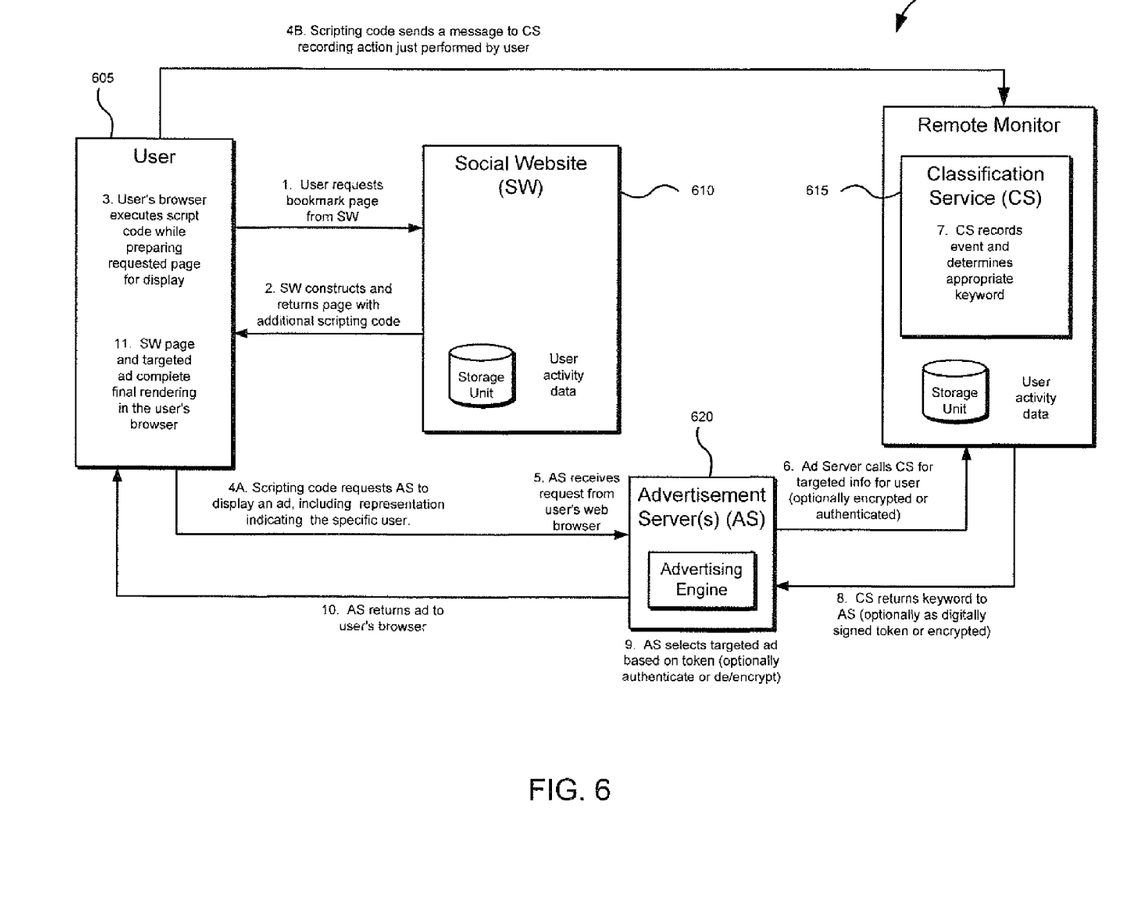
FIG. 6 is a schematic illustration depicting dataflow according to an alternative embodiment of the present invention.

FIG. 6 is a schematic diagram representing data flow in and alternative example embodiment 600 of the invention. This embodiment similarly begins with the user 605 requesting, for example, a bookmark page from a social website 610 (step 1). Here, however, the social website 610 constructs a webpage and returns the page to the user 605 with additional scripting code (step 2). The users browser 605 executes the scripting code while preparing the requested webpage for display (step 3). Next, the scripting code may use a forked process to request the advertisement server 620 to display in the ad where the request includes a representation indicating a specific user (step 4A) and may also send a message to the CS 615 recording the action just performed by the user (step 4B). Because this embodiment 600 uses a forked process, the CS 615 is not guaranteed to record the event before the CS performs its ad selecting analysis.

Next, the advertisement server 620 receives a request from the user's web browser 605 (step 5) and then calls the CS 615 for targeted information for that specific user (step 6). The CS 615 responsively analyzes the request and determines an appropriate keyword (step 7). The CS 615 then returns a keyword or digitally signed token to the advertisement server 620 (step 8). If the data was authenticated the advertisement server 620 confirms the token's authenticity using CS's public key or other authentication techniques known to one skilled in the art. Next, the advertisement service 620 selects a targeted ad based on the received token/keyword (step 9) and returns the determined ad to the user's browser 605 (step 10). Then the page returned by the social website 610 (step 2) is combined with the targeted ad and sent to the user's browser 605 for rendering (step 11).

As mentioned previously, various communications may be made secured digitally signed encrypted/decrypted between the various modules (405, 410, 415, 420, 505, 510, 515, 520, 605, 610, 615, 620) in FIGS. 4, 5 and 6.

The block diagrams of FIGS. 4, 5, and 6 are merely representative and that more or fewer units may be used, and operations may not necessary be divided up as described herein. Also, a processor executing software may operate to execute operations performed by the units, where various units, separately or in combination may represent a processor, field programmable gate array (FPGA), application specific integrated circuit (ASIC), or the like. It should be understood that the block diagrams may, in practice, be implemented in hardware, firmware, or software. If implemented in software, the software may be any form capable of performing operations described herein, stored on any form of computer readable-medium, such as RAM, ROM, CD-ROM, and loaded and executed by a general purpose or application specific processor capable of performing operations described herein.

Figure 7:
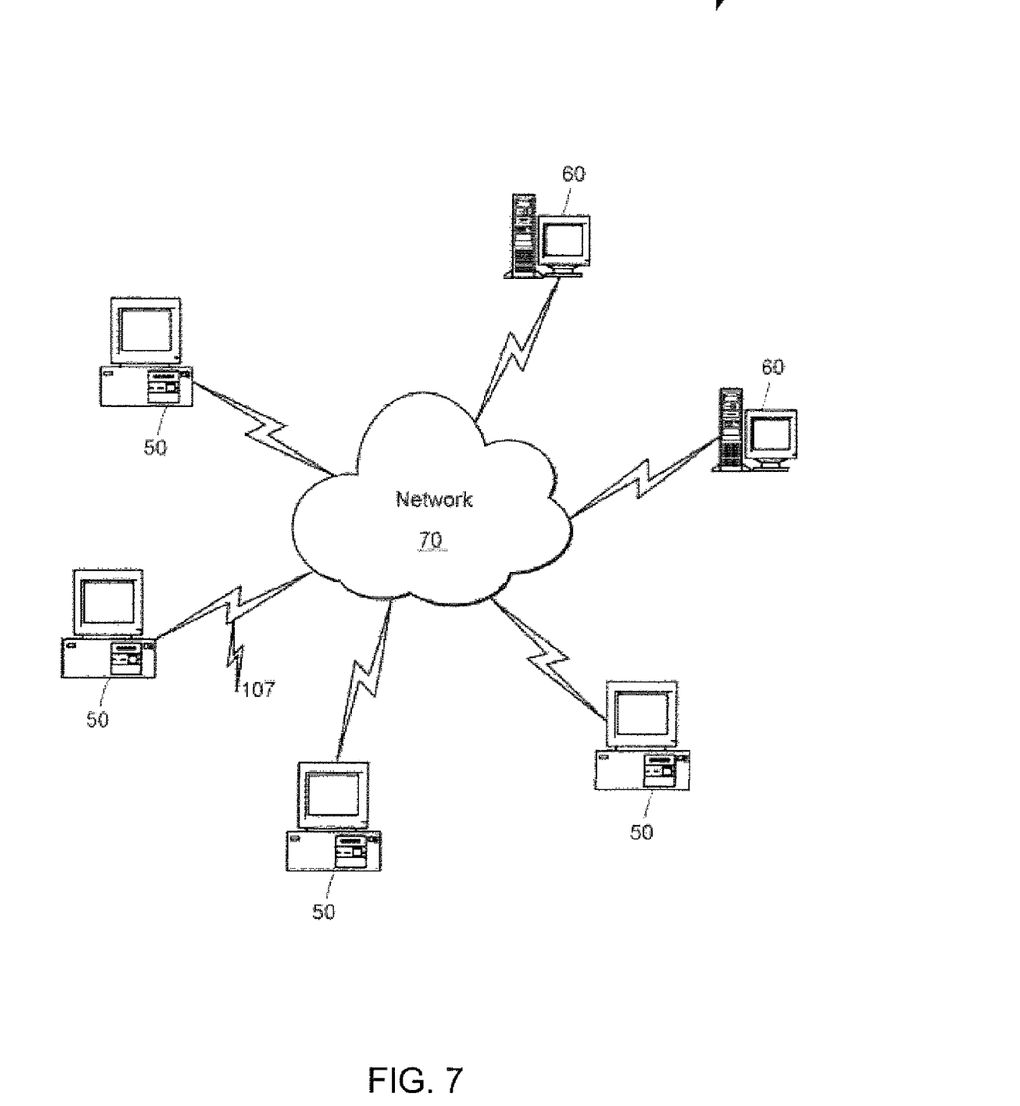
FIG. 7 is a schematic view of a computer network environment in which the principles of the invention may be implemented.

FIG. 7 illustrates a generalized computer network 700 or similar digital processing environment in which the invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8:
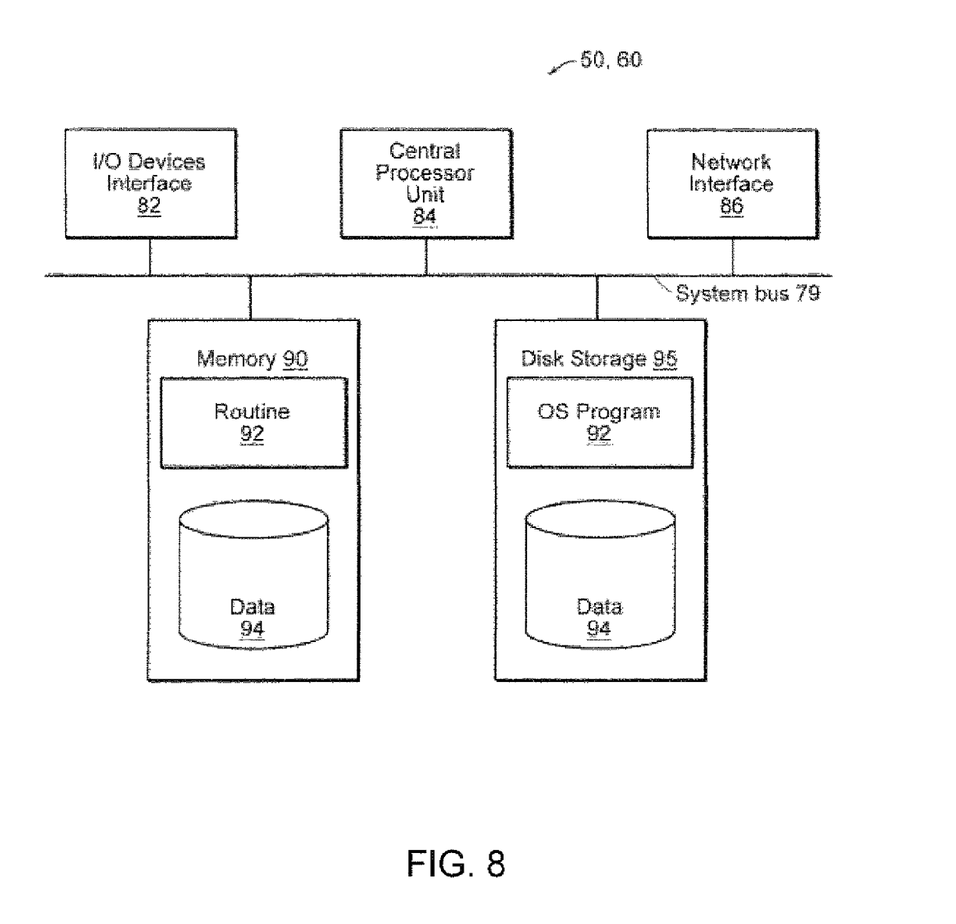
FIG. 8 is a block diagram of the internal structure of a computer from the FIG. 7 computer network environment.

FIG. 8 is a diagram of the internal structure of a computer 50, 60 (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., remote monitoring, processing, storing and reporting code 63 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In some embodiments computer system 40 employs a Windows™ (Microsoft) operating system, in other embodiments a Linux operating system, and in other embodiments a UNIX™ operating system. Other operating systems and system configurations are suitable. Applicant claims trademark rights to the terms "Seethroo", "Seethroo Observer", and "Observer URL."

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 7 and 8 are for purposes of illustration and not limitation of the present invention.

What is claimed is:

1. A method to remotely monitor a plurality of websites that allow user authored and posted content and are hosted on respective website servers, comprising:

given: the plurality of websites and a plurality of users for each of the plurality of websites; for each given one of the plurality of websites, each of the plurality of users engaging in a respective user activity that generates user authored and posted content on that website, that website recording, for each user, a representation of the respective user activity, the representation containing data describing the user activity and being a recorded representation of user activity:

at one or more remote monitoring servers, each of the one or more remote monitoring servers being separate from each of the website servers:

(a) receiving, from each of the plurality of websites and for each of the plurality of users, the recorded representations of user activity;

(b) inputting each recorded representation of user activity into a remote monitoring program executing at the one or more remote monitoring servers;

(c) parsing, using the remote monitoring program, each inputted recorded representation of user activity to identify the data describing the user activity;

(d) outputting each parsed recorded representation of user activity, each outputted parsed recorded representation containing at least a subset of the identified data found in each recorded representation of user activity;

thereby creating aggregated transformed representations of user activity; and (e) using the aggregated transformed representations of user activity to remotely monitor the plurality of web sites.

2. The method according to claim 1 wherein website recording of user activity is in response to a call from one of the plurality of websites triggered by user activity in connection with the one website.

3. The method according to claim 2 wherein the call is an application programming interface (API) call.

4. The method according to claim 1 wherein the recorded representations of user activity are in the form of a uniform resource locator (URL).

5. The method according to claim 1 wherein parsing further involves normalizing and the outputted parsed representations are normalized.

6. The method according to claim 1 further comprising performing on-the-fly or batch-processed analysis of aggregated transformed representations of user activity.

7. The method according to claim 1 further including querying a classification service (CS) prior to displaying a requested web page at one of the plurality of websites, wherein the CS determines user target information.

8. The method according to claim 1 further comprising communicating the aggregated transformed representations of user activity to a third-party location.

9. The method according to claim 1 wherein parsing includes parsing recorded representations of user activity in a substantially real-time manner.

10. The method of claim 1 wherein at least one of the plurality of web sites is a website allowing use of any of: commenting, blogging, tagging or bookmarking associated with website content.

11. An apparatus to remotely monitor a plurality of websites hosted on respective website servers and that allow user authored and posted content, comprising:

given: the plurality of websites and a plurality of users for each of the plurality of websites; for each given one of the plurality of websites, each of the plurality of users engaging in a respective user activity that generates user authored and posted content on that website, that website recording, for each user, a representation of the respective user activity, the representation containing data describing the user activity and being a recorded representation of user activity:

one or more remote monitoring servers, each of the one or more remote monitoring servers being separate from each of the web site and configured to:

(a) receive, from each of the plurality of websites and for each of the plurality of users, the recorded representations of user activity;

(b) input each recorded representation of user activity into a remote monitoring program executing at the one or more remote monitoring servers;

(c) parse, using the remote monitoring program, each inputted recorded representation of user activity to identify the data describing the user activity;

(d) output each parsed recorded representation of user activity, each outputted parsed recorded representation containing at least a subset of the identified data found in each recorded representation of user activity;

thereby creating aggregated transformed representations of user activity; and (e) use the aggregated transformed representations of user activity to remotely monitor the plurality of websites.

12. The apparatus according to claim 11 wherein website recording of user activity is in response to a call from one of the plurality of websites triggered by user activity in connection with the one of the plurality of websites.

13. The apparatus according to claim 12 wherein the call is an Application Programming Interface (API) call.

14. The apparatus according to claim 11 wherein the recorded representations of user activity are in the form of a uniform resource locator (URL).

15. The apparatus according to claim 11 wherein the remote monitoring servers are configured to normalize as part of parsing and the outputted parsed representations are normalized.

16. The apparatus according to claim 11 wherein the remote monitoring server is configured to perform on-the-fly or batch-processed analysis of the aggregated transformed representations of user activity.

17. The apparatus according to claim 11 further including a querying unit configured to query a classification service (CS) prior to displaying a requested web page at one of the plurality of websites, wherein the CS determines user target information.

18. The apparatus according to claim 11 wherein the remote monitoring server is further configured to communicate the aggregated transformed representations of user activity to a third-party location.

19. The apparatus according to claim 11 wherein the remote monitoring server is configured to parse recorded representations of user activity in a substantially real-time manner.

20. The apparatus according to claim 11 wherein at least one of the plurality of websites is a website allowing use of any of: commenting, blogging, tagging or bookmarking of website content.

21. A computer program product for remotely monitoring a plurality of websites allowing user authored and posted content and hosted on respective website servers, comprising:

given: the plurality of websites and a plurality of users for each of the plurality of websites; for each given one of the plurality of websites, each of the plurality of users engaging in a respective user activity that generates user authored and posted content on that website, that website recording, for each user, a representation of the respective user activity, the representation containing data describing the user activity and being a recorded representation of user activity:

a computer program product stored on a non-transitory computer readable storage medium having computer readable instructions stored thereon, which, when loaded and executed by a processor, causes the processor to:

at one or more remote monitoring servers, each of the one or more remote monitoring servers being separate from each of the website:

(a) receive, from each of the plurality of websites and for each of the plurality of users, the recorded representations of user activity;

(b) input each recorded representation of user activity into a remote monitoring program executing at the one or more remote monitoring servers;

(c) parse, using the remote monitoring program, each 1to identify the data describing the user activity;

(d) output each parsed recorded representation of user activity, each outputted parsed recorded representation containing at least a subset of the identified data found in each recorded representation of user activity;

thereby creating aggregated transformed representations of user activity; and (e) use the aggregated transformed representations of user activity to remotely monitor the plurality of websites.

22. The computer program product of claim 21, wherein parsing further involves standardizing the inputted recorded representations of user activity.

23. A computer system to remotely monitor a plurality of websites that allow user authored and posted content and are hosted on respective website servers, comprising:

given: the plurality of websites and a plurality of users for each of the plurality of websites; for each given one of the plurality of websites, each of the plurality of users engaging in a respective user activity that generates user authored and posted content on that website, that website recording, for each user, a representation of the respective user activity, the representation containing data describing the user activity and being a recorded representation of user activity:

at one or more remote monitoring servers, each of the one or more remote monitoring servers being separate from each of the website:

(a) receiving means, for receiving from each of the plurality of websites and for each of the plurality of users, the recorded representations of user activity;

(b) input means, for inputting each recorded representation of user activity into a remote monitoring program executing at the one or more remote monitoring servers;

(c) parsing means, for parsing using the remote monitoring program, each inputted recorded representation of user activity to identify the data describing the user activity;

(d) output means, for outputting each parsed recorded representation of user activity, each outputted parsed recorded representation containing at least a subset of the identified data found in each recorded representation of user activity;

thereby creating aggregated transformed representations of user activity;

the one or more remote monitoring servers being further configured to use the aggregated transformed representations of user activity to remotely monitor the plurality of websites.

24. The computer system of claim 23, wherein the parsing means are further for standardizing the inputted recorded representations of user activity.

* * * * *